United States Patent
Wei et al.

(10) Patent No.: US 9,481,125 B2
(45) Date of Patent: Nov. 1, 2016

(54) METHOD FOR MAKING PATTERNED CARBON NANOTUBE ARRAY AND CARBON NANOTUBE DEVICE

(71) Applicants: Tsinghua University, Beijing (CN); HON HAI PRECISION INDUSTRY CO., LTD., New Taipei (TW)

(72) Inventors: Yang Wei, Beijing (CN); Hao-Ming Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 32 days.

(21) Appl. No.: 14/524,800

(22) Filed: Oct. 27, 2014

(65) Prior Publication Data

US 2015/0367557 A1    Dec. 24, 2015

(30) Foreign Application Priority Data

Jun. 19, 2014    (CN) .......................... 2014 1 0274924

(51) Int. Cl.
| | | |
|---|---|---|
| *B32B 3/02* | (2006.01) | |
| *B29C 59/00* | (2006.01) | |
| *B29C 59/02* | (2006.01) | |
| *B29K 105/16* | (2006.01) | |

(52) U.S. Cl.
CPC ........... *B29C 59/005* (2013.01); *B29C 59/022* (2013.01); *B29C 2059/023* (2013.01); *B29C 2059/028* (2013.01); *B29K 2105/167* (2013.01); *Y10T 428/24802* (2015.01)

(58) Field of Classification Search
CPC ... B82Y 40/00; B29C 59/005; B29C 59/029; Y10T 428/24802; B29K 2105/167
See application file for complete search history.

(56) References Cited

U.S. PATENT DOCUMENTS

| | | | |
|---|---|---|---|
| 8,048,256 B2 | 11/2011 | Feng et al. | |
| 8,068,626 B2 | 11/2011 | Jiang et al. | |
| 8,101,953 B2 | 1/2012 | Jiang et al. | |
| 8,247,036 B2 | 8/2012 | Jiang et al. | |
| 8,248,377 B2 | 8/2012 | Jiang et al. | |
| 8,269,932 B2 | 9/2012 | Fu et al. | |
| 8,822,829 B2 | 9/2014 | Cheng et al. | |
| 2006/0057290 A1* | 3/2006 | Glatkowski | B82Y 10/00 427/256 |
| 2007/0092431 A1* | 4/2007 | Resasco | B01J 23/882 423/447.3 |
| 2008/0283269 A1* | 11/2008 | Graham, Jr. | B81C 1/00031 174/98 |
| 2010/0006278 A1 | 1/2010 | Fan et al. | |
| 2010/0075024 A1* | 3/2010 | Ajayan | C08K 7/24 427/66 |
| 2010/0123267 A1 | 5/2010 | Jiang et al. | |
| 2010/0170891 A1 | 7/2010 | Feng et al. | |

(Continued)

FOREIGN PATENT DOCUMENTS

| | | |
|---|---|---|
| CN | 101626674 | 1/2010 |
| CN | 102050424 | 5/2011 |

(Continued)

*Primary Examiner* — Elizabeth Mulvaney
(74) *Attorney, Agent, or Firm* — Zhigang Ma

(57) ABSTRACT

A method for patterning a carbon nanotube array is disclosed. A carbon nanotube array is transferred onto a surface of a substitute substrate. The carbon nanotube array has a second surface adjacent to the substitute substrate and a first surface away from the substitute substrate. The carbon nanotube array is laser etched from the first surface to divide the carbon nanotube array into two areas which are a preserving area and a removing area. A carbon nanotube structure is drawn from the removing area.

15 Claims, 11 Drawing Sheets

(56) References Cited

U.S. PATENT DOCUMENTS

2011/0109006 A1    5/2011   Zheng et al.
2011/0171419 A1    7/2011   Li et al.

FOREIGN PATENT DOCUMENTS

| CN | CN102820073 A | 12/2012 |
|----|---------------|---------|
| TW | 201202131     | 1/2012  |

\* cited by examiner

METHOD FOR MAKING PATTERNED CARBON NANOTUBE ARRAY AND CARBON NANOTUBE DEVICE

CROSS-REFERENCE TO RELATED APPLICATIONS

This application claims all benefits accruing under 35 U.S.C. §119 from China Patent Application No. 201410274924.0, filed on Jun. 19, 2014 in the China Intellectual Property Office, the contents of which are hereby incorporated by reference.

FIELD

The subject matter herein generally relates to methods for making patterned carbon nanotube arrays and carbon nanotube devices.

BACKGROUND

Carbon nanotubes are tubules of carbon generally having a diameter of about 0.5 to about 100 nanometers, and composed of a number of coaxial cylinders of graphite sheets. Carbon nanotubes along their axial directions have interesting and potentially useful thermal, electrical, and mechanical properties, and have recently attracted a great deal of attention for use in different applications such as field emitters, thermal and electrical conductors, and high strength composites. A carbon nanotube array is grown on a flat surface of a silicon wafer by using a chemical vapor deposition (CVD) method and has the carbon nanotubes aligned along a direction substantially perpendicular to the flat surface of the silicon wafer. The excellent axial properties of the carbon nanotubes can be easily used by using the carbon nanotube array.

BRIEF DESCRIPTION OF THE DRAWING

Implementations of the present technology will now be described, by way of example only, with reference to the attached figures, wherein.

DETAILED DESCRIPTION

Figure 1:
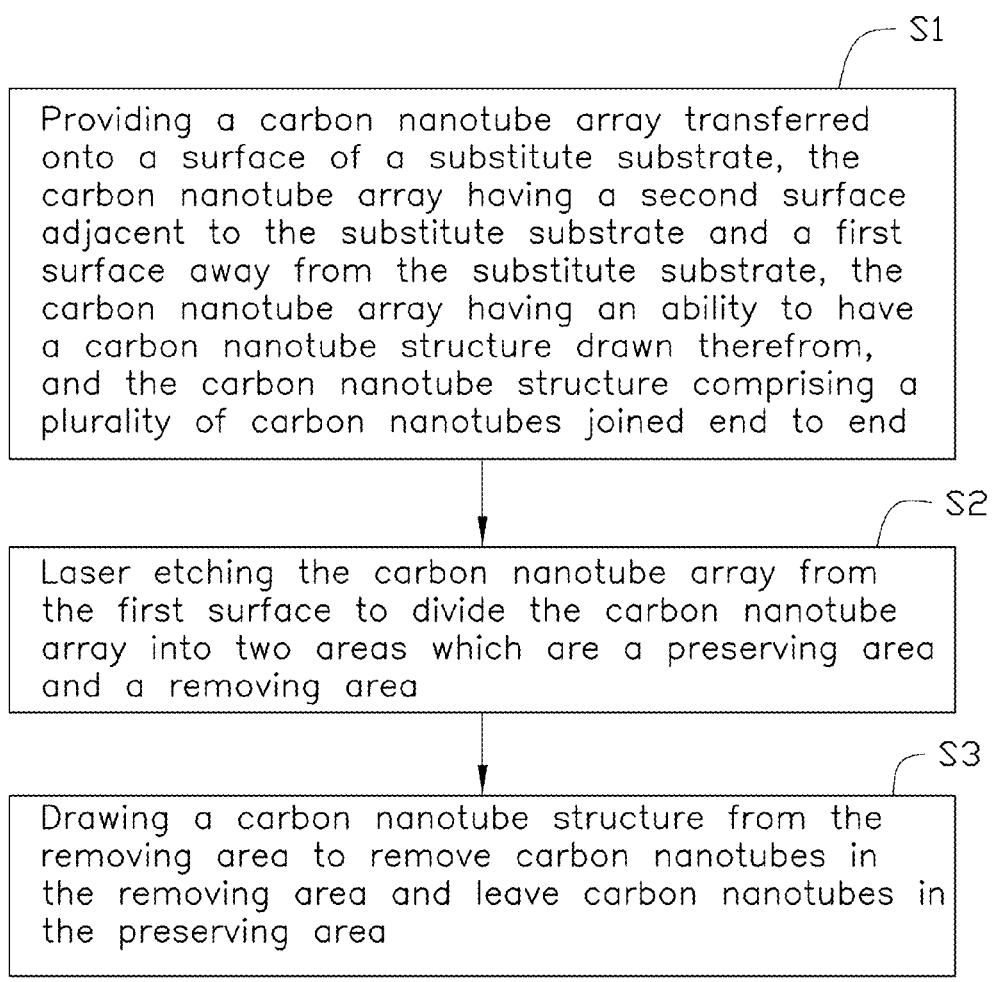
FIG. 1 is a flow chart of an embodiment of a method for a patterning carbon nanotube array.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other description that is described, such that the component need not be exactly conforming to the description. The term "comprising," when utilized, means "including, but not necessarily limited to"; it specifically indicates open-ended inclusion or membership in the so-described combination, group, series, and the like.

Figure 2:
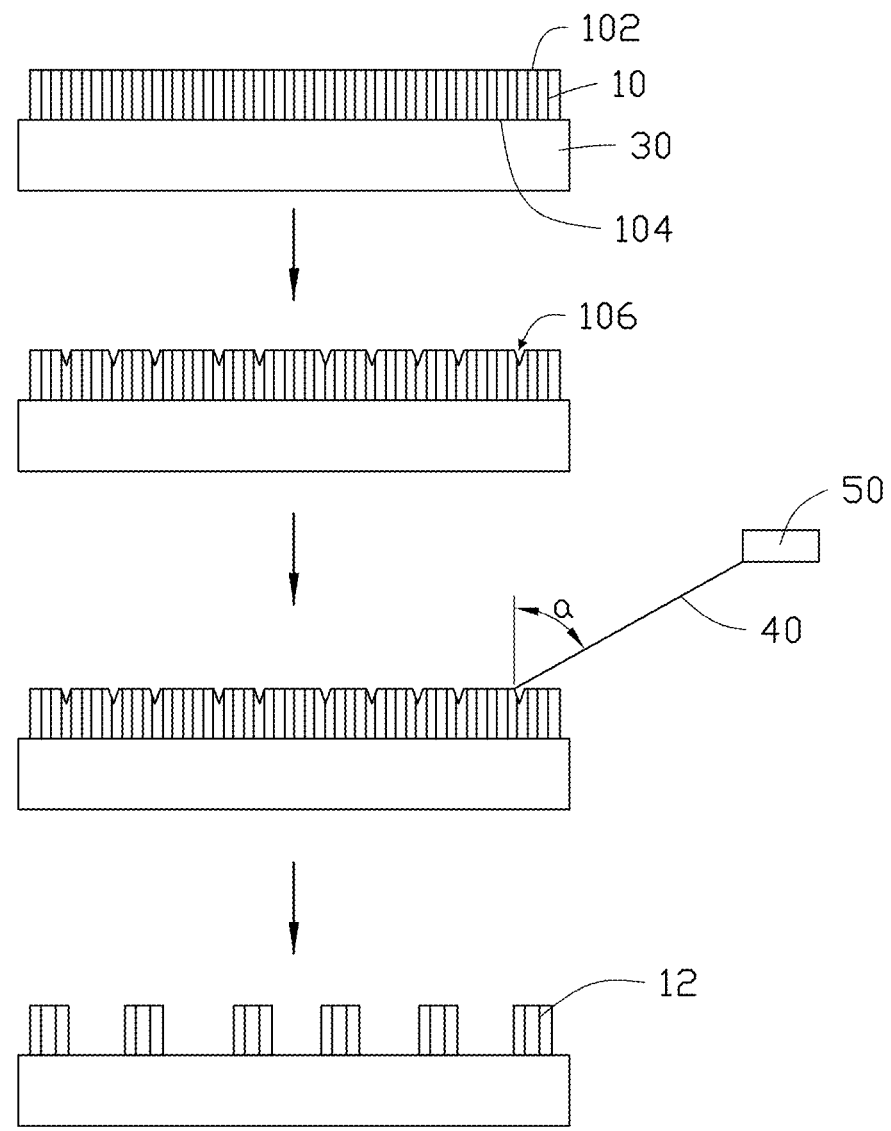
FIG. 2 is a schematic side view of an embodiment of the method for patterning the carbon nanotube array.
Figure 3:
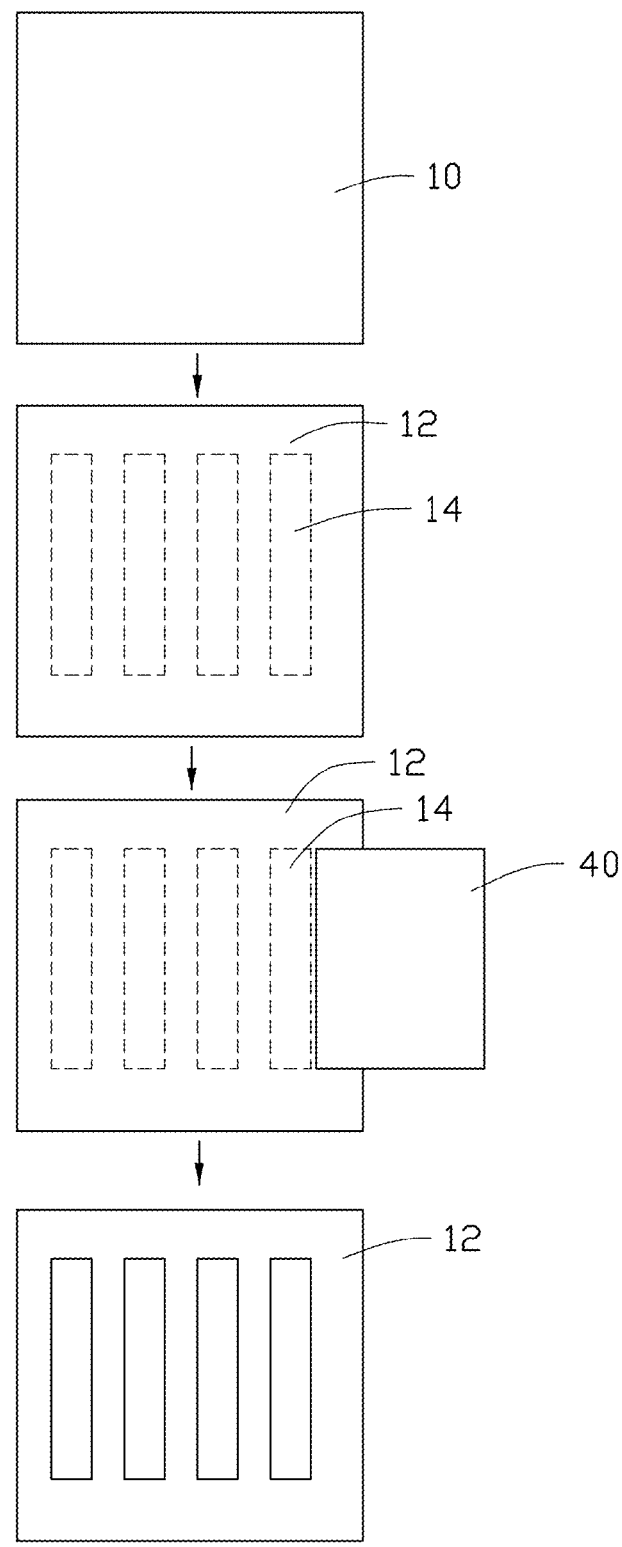
FIG. 3 is a schematic top view of an embodiment of the method for patterning the carbon nanotube array.

Referring to FIG. 1 to FIG. 3, the present disclosure is described in relation to a method for patterning a carbon nanotube array 10.

In block S1, a carbon nanotube array 10 transferred onto a surface of a substitute substrate 30 is provided. The carbon nanotube array 10 has a second surface 104 adjacent to the substitute substrate 30 and a first surface 102 away from the substitute substrate 30. The carbon nanotube array 10 has an ability to have a carbon nanotube structure 40 drawn therefrom. The carbon nanotube structure 40 comprises a plurality of carbon nanotubes joined end to end.

In block S2, the first surface 102 of the carbon nanotube array 10 is laser etched to divide the carbon nanotube array 10 into two areas which are a preserving area 12 and a removing area 14.

In block S3, a carbon nanotube structure 40 is drawn from the removing area 14, thus removing the carbon nanotubes in the removing area 14 and leaving carbon nanotubes in the preserving area 12.

The carbon nanotube structure 40 can be a free-standing structure including a plurality of carbon nanotubes joined end-to-end by van der Waals attractive force therebetween. The carbon nanotube structure 40 can be a carbon nanotube film or a carbon nanotube wire.

Transferring of Carbon Nanotube Array

Figure 4:
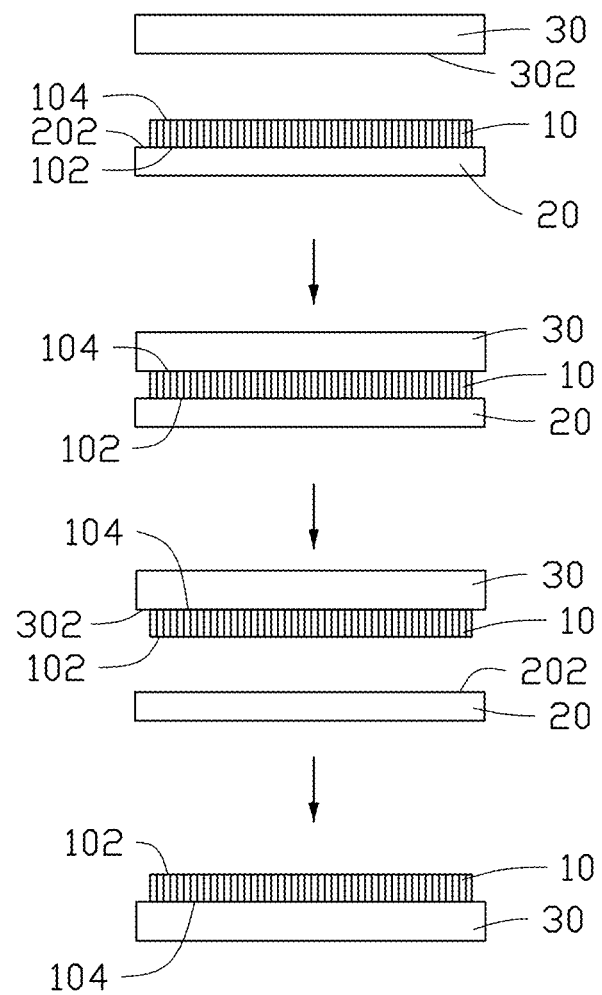
FIG. 4 is a schematic side view of an embodiment of the method for transferring the carbon nanotube array.

Referring to FIG. 4, in block S1, the carbon nanotube array 10 is originally grown/formed on a growing substrate 20 and is transferred to the substitute substrate 30.

First, the growing substrate 20, having the carbon nanotube array 10 grown, thereon is provided. The first surface 102 of the carbon nanotube array 10 is on the growing substrate 20. The second surface 104 of the carbon nanotube array 10 is away from the growing substrate 20. The carbon nanotube array 10 is grown to have a state/shape/form that is capable of having a carbon nanotube structure 40 drawn therefrom. The carbon nanotube array 10 is transferred from growing substrate 20 to the substitute substrate 30 and the state/shape/form of the carbon nanotube array 10, before, during, and after the transfer onto the substitute substrate 30, is still capable of having the carbon nanotube structure 40 drawn therefrom.

The carbon nanotube array 10 is grown on the growing substrate 20 by a chemical vapor deposition (CVD) method. The carbon nanotube array 10 comprises a plurality of carbon nanotubes oriented substantially perpendicular to a growing surface of the growing substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube structure 40, which can be in the shape of a film or a wire. The carbon nanotube array 10, that can have the carbon nanotube structure 40 drawn therefrom, can be a super aligned carbon nanotube array. A material of the growing substrate 20 can be P-type silicon, N-type silicon, or other materials that are suitable for growing the super aligned carbon nanotube array.

The carbon nanotube structure 40 drawn from the carbon nanotube array 10 comprises a plurality of carbon nanotubes joined end-to-end and can be a free-standing carbon nanotube film. The carbon nanotube film comprises a plurality of carbon nanotubes substantially aligned along the same direction.

Figure 5:
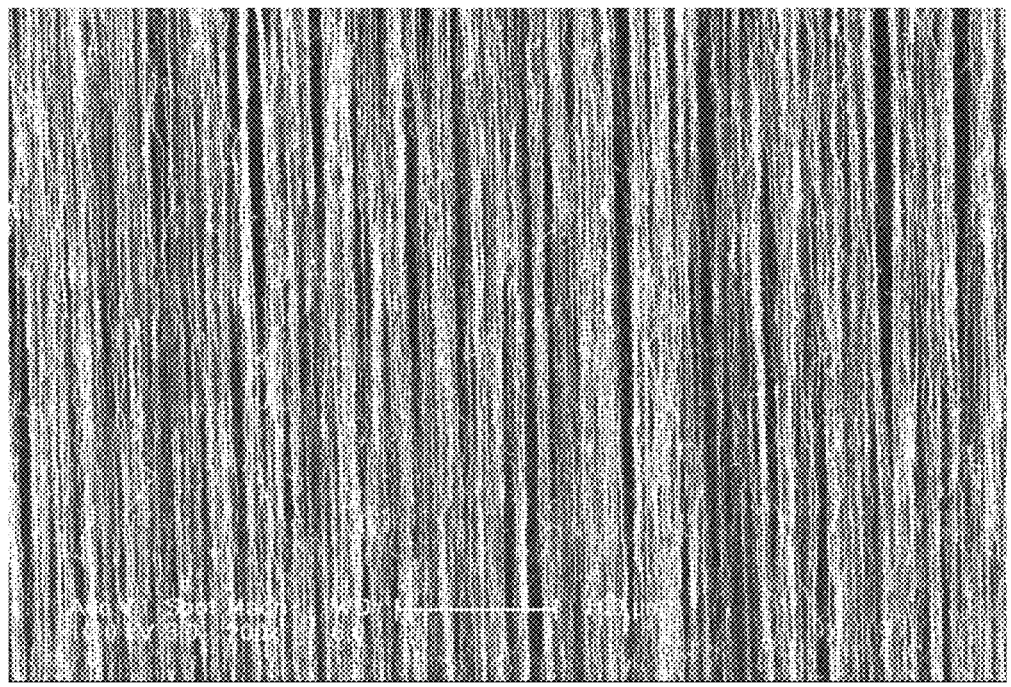
FIG. 5 shows a scanning electron microscope (SEM) image of a carbon nanotube film drawn from the carbon nanotube array.
Figure 6:
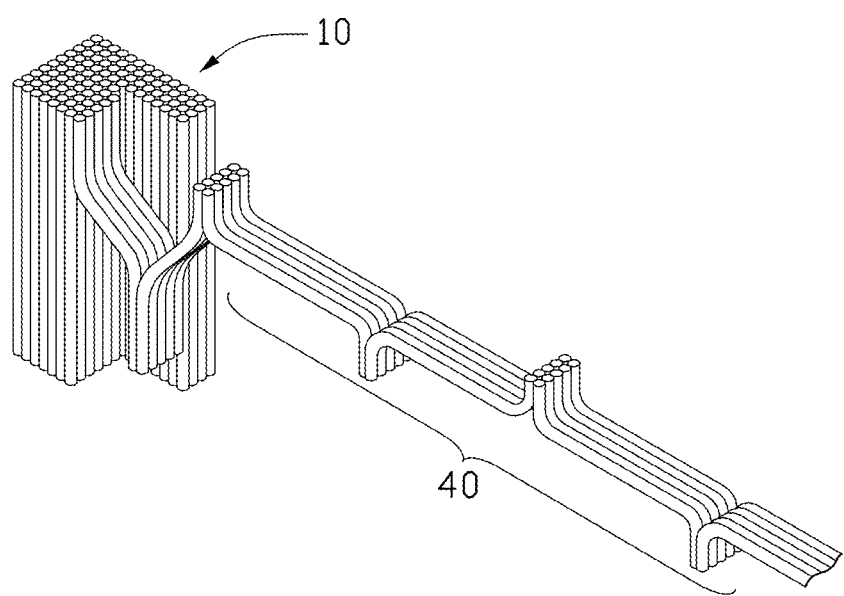
FIG. 6 shows a schematic structure view carbon nanotubes joined end-to-end.

Referring to FIG. 5 and FIG. 6, the carbon nanotube film can comprise or consist of a plurality of carbon nanotubes. In the carbon nanotube film, the overall aligned direction of a majority of the carbon nanotubes is substantially aligned along the same direction parallel to a surface of the carbon nanotube film. A majority of the carbon nanotubes are substantially aligned along the same direction in the carbon nanotube film. Along the aligned direction of the majority of carbon nanotubes, each carbon nanotube is joined to adjacent carbon nanotubes end to end by van der Waals attractive force therebetween, whereby the carbon nanotube film is capable of being free-standing structure. There may be a minority of carbon nanotubes in the carbon nanotube film that are randomly aligned. However, the number of the randomly aligned carbon nanotubes is very small, in comparison, and does not affect the overall oriented alignment of the majority of carbon nanotubes in the carbon nanotube film. Some of the majority of the carbon nanotubes in the carbon nanotube film that are substantially aligned along the same direction may not be exactly straight, and can be curved at a certain degree, or not exactly aligned along the overall aligned direction by a certain degree. Therefore, partial contacts can exist between the juxtaposed carbon nanotubes in the majority of the carbon nanotubes aligned along the same direction in the carbon nanotube film. The carbon nanotube film can comprise a plurality of successive and oriented carbon nanotube segments. The plurality of carbon nanotube segments are joined end to end by van der Waals attractive force. Each carbon nanotube segment comprises a plurality of carbon nanotubes substantially parallel to each other, and the plurality of paralleled carbon nanotubes are in contact with each other and combined by van der Waals attractive force therebetween. The carbon nanotube segment has a desired length, thickness, uniformity, and shape. There can be clearances between adjacent and juxtaposed carbon nanotubes in the carbon nanotube film. A thickness of the carbon nanotube film at the thickest location is about 0.5 nanometers to about 100 microns (e.g., in a range from 0.5 nanometers to about 10 microns). When the carbon nanotube structure 40 has a small width, the carbon nanotube structure 40 can be a free-standing carbon nanotube wire.

The term "free-standing" comprises, but is not limited to, a structure that does not need to be supported by a substrate. For example, a free-standing carbon nanotube structure 40 can sustain the weight of itself when it is hoisted by a portion thereof without any significant damage to its structural integrity. If the free-standing carbon nanotube structure 40 is placed between two separate supporters, a portion of the free-standing carbon nanotube structure 40 suspended between the two supporters can maintain structural integrity. The free-standing carbon nanotube structure 40 can be realized by the successive carbon nanotubes joined end to end by van der Waals attractive force.

In the present disclosure, the growing of the carbon nanotube array 10 and the drawing of the carbon nanotube structure 40 are processed on different structures (i.e., the growing substrate 20 and the substitute substrate 30). The substitute substrate 30 for drawing the carbon nanotube structure 40 can be made of low-price materials, and the growing substrate 20 can be recycled quickly. Thus, production of the carbon nanotube structure 40 can be optimized.

The material of the substitute substrate 30 can be at least one of soft, elastic, and rigid solid substrate, such as metal, glass, crystal, ceramic, silicon, silicon dioxide, plastic, and resin, such as polymethyl methacrylate and polyethylene terephthalate.

The substitute substrate 30 has a surface 302 to accept the carbon nanotube array 10 thereon. The surface 302 of the substitute substrate 30 can be flat when the carbon nanotube array 10 is grown on a flat growing surface 202 of the growing substrate 20. During transferring of the carbon nanotube array 10 from the growing substrate 20 to the substitute substrate 30, the state of the carbon nanotube array 10 is still capable of drawing the carbon nanotube structure 40 from the carbon nanotube array 10 on the substitute substrate 30. The carbon nanotube array 10 transferred to the substitute substrate 30 is still a super aligned carbon nanotube array. The carbon nanotubes of the carbon nanotube array 10 are substantially perpendicular to the surface of the substitute substrate 30.

The carbon nanotube array 10 is arranged upside down on the surface 302 of the substitute substrate 30. The carbon nanotubes are grown from the growing surface 202 of the growing substrate 20 to form the carbon nanotube array 10. The carbon nanotube comprises a bottom end adjacent or contacting the growing substrate 20 and a top end away from the growing substrate 20. The bottom ends of the carbon nanotubes form the first surface 102 of the carbon nanotube array 10, and the top ends of the carbon nanotubes form the second surface 104 of the carbon nanotube array 10. After the carbon nanotube array 10 is transferred to the substitute substrate 30, the second surface 104 of the carbon nanotube array 10 is now adjacent to or contacting the substitute substrate 30, and the first surface 102 of the carbon nanotube array 10 is now away from the substitute substrate 30.

In one embodiment, the carbon nanotube array 10 is transferred by:
contacting the surface 302 of the substitute substrate 30 to the second surface 104 of the carbon nanotube array 10; and
separating the substitute substrate 30 from the growing substrate 20, thereby separating the first surface 102 of the carbon nanotube array 10 from the growing substrate 20 to transfer the carbon nanotube array 10 from the growing substrate 20 to the substitute substrate 30.

The carbon nanotube array 10 can be transferred from the growing substrate 20 to the substitute substrate 30 at room temperature (e.g., 10° C. to 40° C.).

The surface 302 of the substitute substrate 30 and the second surface 104 of the carbon nanotube array 10 can be bonded only by van der Waals attractive forces, and a bonding force ($F_{BC}$) between the carbon nanotube array 10 and the substitute substrate 30 is smaller than the van der Waals attractive forces ($F_{CC}$) between the carbon nanotubes in the carbon nanotube array 10. Meanwhile, the bonding force $F_{BC}$ is larger than the bonding force ($F_{AC}$) between the carbon nanotube array 10 and the growing substrate 20, to separate the carbon nanotube array 10 from the growing substrate 20. Therefore, $F_{AC}<F_{BC}<F_{CC}$ must be satisfied.

To satisfy $F_{AC}<F_{BC}<F_{CC}$, the substitute substrate 30 can have a suitable surface energy and a suitable interface energy can exist between the substitute substrate 30 and the carbon nanotube array 10. Thus, the substitute substrate 30 can generate enough bonding force (e.g., van der Waals attractive force) with the carbon nanotube array 10 simply by contacting the carbon nanotube array 10. A suitable material of the substitute substrate 30 must have a sufficient bonding force $F_{BC}$ (e.g., van der Waals attractive force) with the second surface 104 of the carbon nanotube array 10 to overcome the bonding force $F_{AC}$ between the carbon nanotube array 10 from the growing substrate 20. The surface 302 of the substitute substrate 30 can be substantially flat. In one embodiment, the material of the substitute substrate 30 is poly(dimethylsiloxane) (PDMS).

The substitute substrate 30 can adhere to the carbon nanotube array 10 without another substance (e.g., an adhesive binder) and only by van der Waals attractive forces. Although the adhesive binder can have a bonding force with the carbon nanotube array 10 greater than the bonding force between the carbon nanotube array 10 and the growing substrate 20, because the van der Waals attractive force between the carbon nanotubes in the carbon nanotube array 10 is small, the bonding force provided by the adhesive binder may be too great (i.e., greater than the bonding force $F_{CC}$ between the carbon nanotubes in the carbon nanotube array 10). In this situation, the carbon nanotube structure 40 cannot be drawn from the transferred carbon nanotube array 10. During the transferring, the substitute substrate 30 can always be in a solid state.

Figure 7:
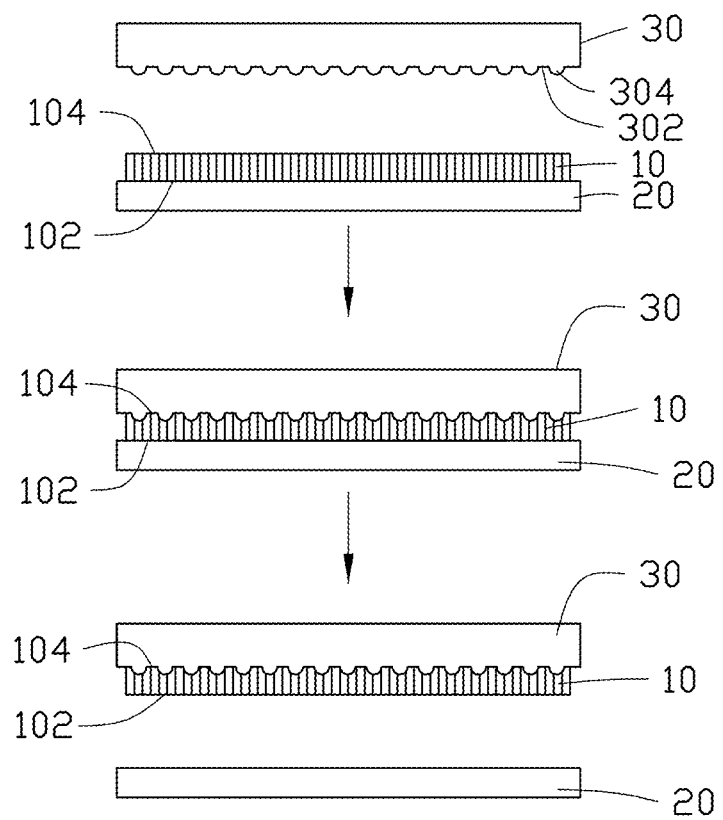
FIG. 7 is a schematic structural view of another embodiment of the method for transferring the carbon nanotube array.

Referring to FIG. 7, in one embodiment, to satisfy $F_{AC}<F_{BC}<F_{CC}$, the substitute substrate 30 can increase the surface area of the surface 302 by using the microstructures 304, thus increasing the $F_{BC}$. The substitute substrate 30 can have the surface 302 with a plurality of microstructures 304 located thereon. The microstructure 304 can have a point shape and/or a long and narrow shape, and can be protrusions and/or recesses. The cross section of the microstructures 304 can be semicircular, rectangular, conical, and/or stepped. The microstructures 304 can be hemi-spheres, convex or concave columns, pyramids, pyramids without tips, and any combination thereof. In one embodiment, the microstructures 304 can be parallel and spaced grooves. In another embodiment, the microstructures 304 can be uniformly spaced hemispherical protrusions. The plurality of microstructures 304 are uniformly distributed on the surface 302 of the substitute substrate 30. In one embodiment, the surface 302 having the microstructures 304 located thereon has a surface area of 30% to 120% more than a smooth surface of equivalent area. The surface 302 sufficiently contacts the second surface 104 of the carbon nanotube array 10. Thus, the material of the substitute substrate 30 is not limited to PDMS and can be other conventional substrate materials such as soft, elastic, and rigid solid materials.

The height of the protrusion and the depth of the recess of the microstructures 304 can be 0.5% to 10% of the height of the carbon nanotube array 10. In one embodiment, the height of the protrusion and the depth of the recess can be in a range from about 5 microns to about 50 microns. The surface 302 needs an overall flatness to sufficiently contact the second surface 104 of the carbon nanotube array 10. The microstructures 304 can be formed on the surface 302 by laser etching, chemical etching, or lithography.

The microstructures 304 make the surface 302 of the substitute substrate 30 relatively rough. When the recessed portion of the surface 302 is in contact with the second surface 104 of the carbon nanotube array 10, the protruded portion of the surface 302 may slightly curve the carbon nanotubes contacting the protruded portion. However, the microstructures 304 are small, so the curve is small, and when the substitute substrate 30 and the growing substrate 20 are separated, the carbon nanotubes can elastically restore to a substantially straight shape and the carbon nanotube array 10 can restore to its original height. Thus, the state of the carbon nanotube array 10 is still capable of having the carbon nanotube structure 40 drawn from the carbon nanotube array 10.

To ensure almost all the top ends of the carbon nanotubes in the carbon nanotube array 10 have sufficient contact with the surface of the substitute substrate 30, the substitute substrate 30 and the growing substrate 20 can be brought close enough to each other. A distance from the surface 302 of the substitute substrate 30 to the surface 202 of the growing substrate 20 can be less than or equal to the height of the carbon nanotube array 10 to apply a pressing force (f) to the carbon nanotube array 10. The pressing force f cannot be too large to ensure the state of the carbon nanotube array 10 is still capable of drawing the carbon nanotube structure 40 when transferred to the substitute substrate 30. The pressing force is not to press the carbon nanotubes down or vary the length direction of the carbon nanotubes in the carbon nanotube array 10, otherwise the state of the carbon nanotube array 10 could change. Thus, the distance between the surface 302 of the substitute substrate 30 and the surface 202 of the growing substrate 20 cannot be too small and should be larger than an extreme value. The extreme value is a value that causes the state of the carbon nanotube array 10 to be unable to draw the carbon nanotube structure 40.

Figure 8:
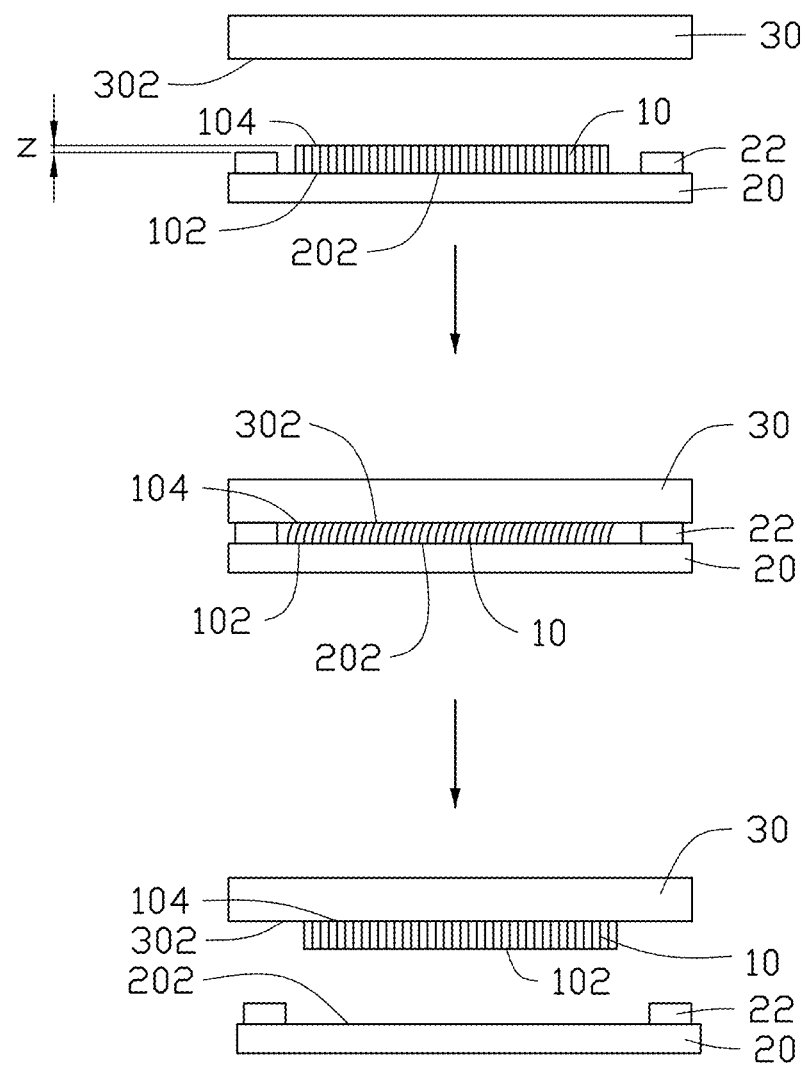
FIG. 8 is a schematic structural view of yet another embodiment of the method for transferring the carbon nanotube array.

However, the pressing force is difficult to control, and the height of the carbon nanotube array 10 is often in tens of microns to hundreds of microns. If the pressing force is too large, the carbon nanotubes in the array 10 may be pressed down. Referring to FIG. 8, in one embodiment, a spacing element 22 is provided. The substitute substrate 30 is spaced from the growing substrate 20 by the spacing element 22. The spacing element 22 is used to limit the distance between the surface 302 of the substitute substrate 30 and the surface 202 of the growing substrate 20. The height of the spacing element 22 located between the substitute substrate 30 and the growing substrate 20 is smaller than or equal to the height of the carbon nanotube array 10 and larger than the extreme value. A height distance (z) between the spacing element 22 and the carbon nanotube array 10 can exist. The spacing element 22 is a solid member. In one embodiment, the spacing element 22 is rigid. By controlling the height of the spacing element 22, the distance between the substitute substrate 30 and the growing substrate 20 can be precisely controlled. The height (m) of the spacing element 22 can be 0.9 times to 1 time of the height (n) of the carbon nanotube array 10 (i.e., m=0.9n to n).

During the pressing of the carbon nanotube array 10, the carbon nanotubes in the carbon nanotube array 10 are still substantially perpendicular to the growing surface of the growing substrate 20. When the height (m) is smaller than the height (n), the carbon nanotubes in the carbon nanotube array 10 can be pressed to be curved slightly. However, the curve is small and when the substitute substrate 30 and the growing substrate 20 are separated, the carbon nanotubes can restore the straight shape and the carbon nanotube array 10 can restore the original height. Thus, the state of the carbon nanotube array 10 is still kept to be capable of having the carbon nanotube structure 40 drawn from the carbon nanotube array 10.

In one embodiment, the spacing element 22 is arranged on the growing substrate 20. In another embodiment, the spacing element 22 is arranged on the substitute substrate 30. In yet another embodiment, the spacing element 22 can be a part of the growing substrate 20 or the substitute substrate 30. A shape of the spacing element 22 is not limited and can be a block, a piece, a column, or a ball. There can be a plurality of spacing elements 22 uniformly arranged around the carbon nanotube array 10. The spacing element 22 can be a round circle around the carbon nanotube array 10. In another embodiment, the spacing elements 22 are a plurality of round columns uniformly arranged around the carbon nanotube array 10. The spacing element 22 can be used with or without the microstructures 304.

During the separating of the substitute substrate 30 away from the growing substrate 20, a majority of the carbon nanotubes in the carbon nanotube array 10 can be detached from the growing substrate 20 at the same time by moving either the substitute substrate 30, the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. The two substrates both moves along the direction perpendicular to the growing surface of the growing substrate 20 and depart from each other.

Figure 9:
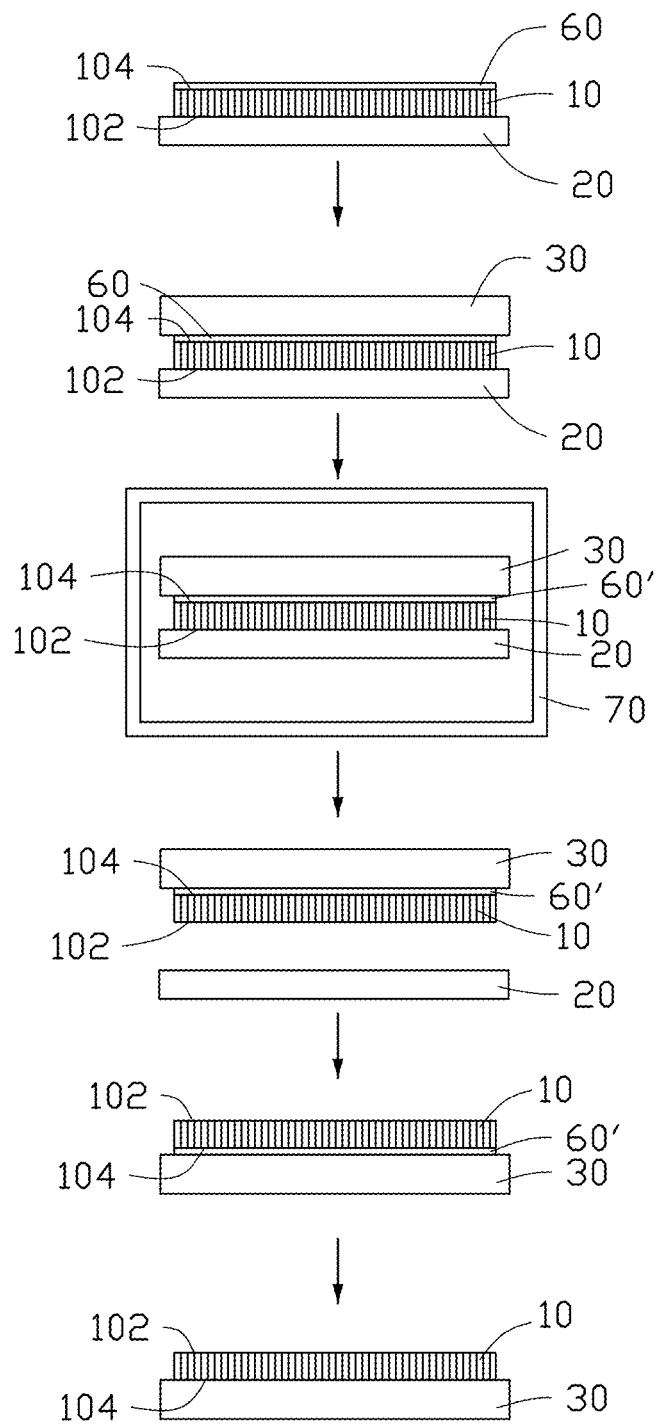
FIG. 9 is a schematic structural view of yet another embodiment of the method for transferring the carbon nanotube array.

Referring to FIG. 9, in another embodiment, the carbon nanotube array 10 is transferred by:

placing the substitute substrate 30 on the second surface 104 of the carbon nanotube array 10 and sandwiching liquid medium 60 between the substitute substrate 30 and the carbon nanotube array 10;

solidifying the liquid medium 60 between the substitute substrate 30 and the carbon nanotube array 10 into solid medium 60';

separating the substitute substrate 30 from the growing substrate 20, thereby separating the first surface 102 of the carbon nanotube array 10 from the growing substrate 20; and removing the solid medium 60' between the substitute substrate 30 and the carbon nanotube array 10.

The liquid medium 60 can be in a shape of fine droplets, mist, or film. The liquid medium 60 can spread on the entire second surface 104. The liquid medium 60 can be water and/or organic solvents with small molecular weights that are volatile at room temperature or easily evaporated by heating. The organic solvent can be selected from ethanol, methanol, and acetone. The liquid medium 60 has a poor wettability for carbon nanotubes. Thus, when a small amount of the liquid medium 60 is on the second surface 104 of the carbon nanotube array 10, it cannot infiltrate inside the carbon nanotube array 10 and will not affect the state of the carbon nanotube array 10. A diameter of the liquid droplet and a thickness of the liquid film can be in a range from about 10 nanometers to about 300 microns. The substitute substrate 30 and the second surface 104 of the carbon nanotube array 10 are both in contact with the liquid medium 60.

During the placing the substitute substrate 30 on the second surface 104, the substitute substrate 30 may apply a pressing force as small as possible to the carbon nanotube array 10. The pressing force can satisfy $0<f<2N/cm^2$. The pressing force does not press the carbon nanotubes down or vary the length direction of the carbon nanotubes in the carbon nanotube array 10. The carbon nanotubes in the carbon nanotube array 10 between the substitute substrate 30 and the growing substrate 20 are always substantially perpendicular to the growing surface of the growing substrate 20.

In one embodiment, the liquid medium 60 is formed on the second surface 104 of the carbon nanotube array 10. The liquid medium 60 can be formed into fine droplets or a mist in the air and drop or collect onto the second surface 104 of the carbon nanotube array 10. The substitute substrate 30 and the carbon nanotube array 10 on the growing substrate 20 are brought together such that the surface of the substitute substrate 30 and the liquid medium 60 on the second surface 104 are contacting each other.

In another embodiment, the liquid medium 60 is formed on the surface of the substitute substrate 30. The liquid medium 60 can be formed into fine droplets or a mist in the air and drop or collect onto the surface of the substitute substrate 30. The substitute substrate 30 and the carbon nanotube array 10 on the growing substrate 20 are brought together such that the second surface 104 of the carbon nanotube array 10 and the liquid medium 60 on the surface of the substitute substrate 30 are contacting each other.

During the solidifying of the liquid medium 60, the temperature of the liquid medium 60 can be decreased to below the freezing point of the liquid medium 60. After the liquid medium 60 is solidified, the substitute substrate 30 and the carbon nanotube array 10 can be firmly bonded together by the solid medium 60' therebetween. In one embodiment, water is frozen into ice below 0° C.

In one embodiment, the laminate of the growing substrate 20, the carbon nanotube array 10, the liquid medium 60, and the substitute substrate 30 can be put into a freezer 70 with a temperature below the freezing point to freeze the liquid medium 60.

Figure 10:
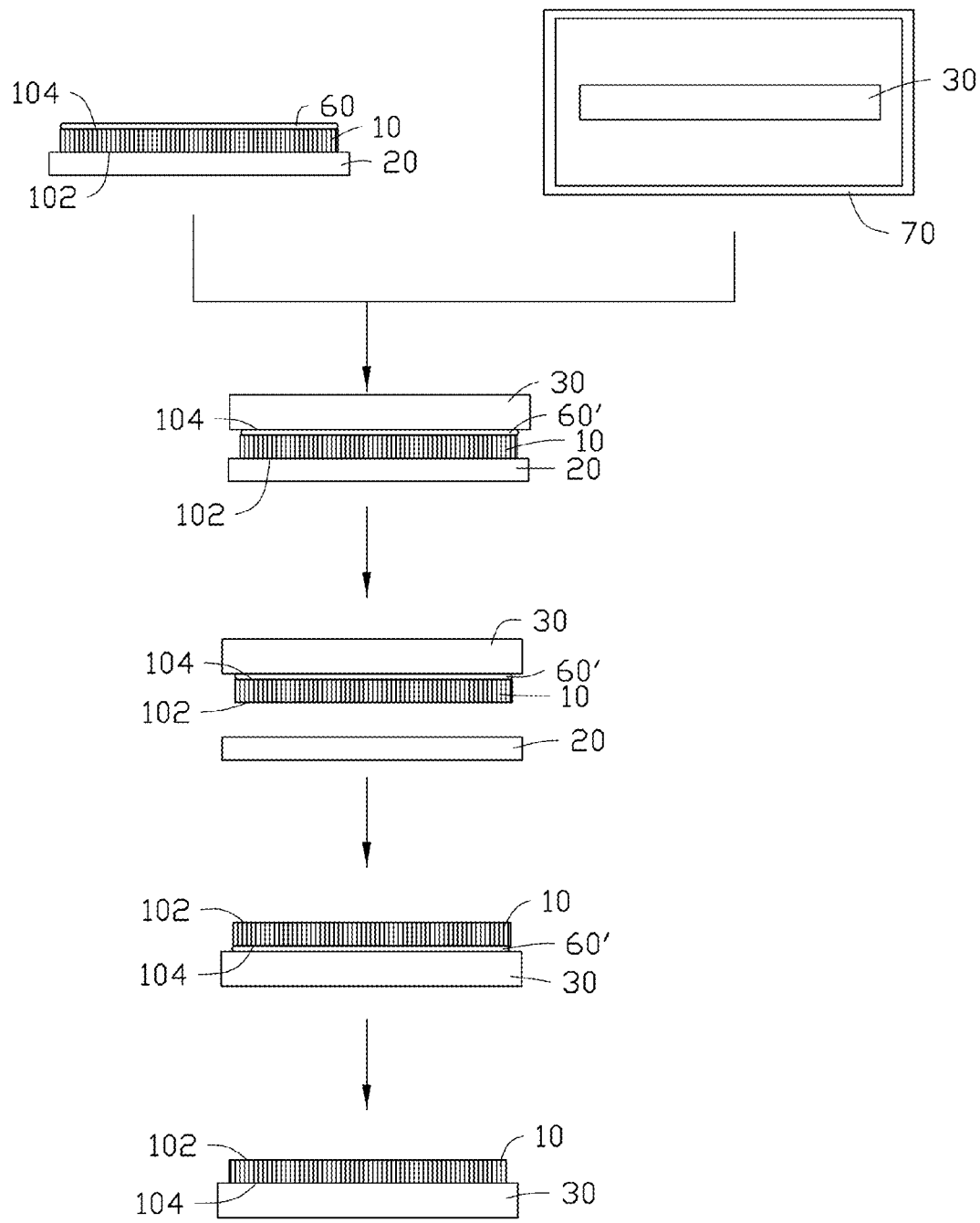
FIG. 10 is a schematic structural view of yet another embodiment of the method for transferring the carbon nanotube array.

Referring to FIG. 10, in another embodiment, when the liquid medium 60 is formed on the second surface 104 of the carbon nanotube array 10, a temperature of the substitute substrate 30 can be decreased to below the freezing point before contacting the substitute substrate 30 with the liquid medium 60. For example, the substitute substrate 30 can be kept in the freezer 70 for a period of time until the substitute substrate 30 reaches a temperature below the freezing point. Thus, when the substitute substrate 30 contacts the liquid medium 60 on the second surface 104 of the carbon nanotube array 10, the liquid medium 60 can be directly frozen into solid medium 60'.

During the separating of the substitute substrate 30 from the growing substrate 20, due to the bonding between the carbon nanotube array 10 and the substitute substrate 30 by the solid medium 60', the separating of the two substrates can separate the carbon nanotube array 10 from the growing substrate 20. During the separating, a majority of the carbon nanotubes in the carbon nanotube array 10 can be detached from the growing substrate 20 at the same time by cutting means, or moving either the substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the substitute substrate 30 and the growing substrate 20 separate, the two substrates both moves along the direction perpendicular to the growing surface of the growing substrate 20 and depart from each other.

During the removing of the solid medium 60', the solid medium 60' can be heated and melt into liquid medium, and dried between the substitute substrate 30 and the carbon nanotube array 10. In another embodiment, the heating can directly sublimate the solid medium 60'. The removal of the solid medium 60' does not affect the state of the carbon nanotube array 10. Due to the thickness of the solid medium 60' being small, after the removal of the solid medium 60', the second surface 104 of the carbon nanotube array 10 can be in contact with the surface of the substitute substrate 30 and bonded by van der Waals attractive forces.

For drawing the carbon nanotube structure 40, the bonding force between the carbon nanotube array 10 and the substitute substrate 30 should be small. The bonding force is increased by the solid medium 60' to separate the carbon nanotube array 10 from the growing substrate 20 and decreased by removing the solid medium 60' before drawing the carbon nanotube structure 40. Thus, the material of the substitute substrate 30 is not limited to PDMS and can be soft, elastic, and rigid solid materials.

Pattering of Carbon Nanotube Array

Referring back to FIG. 1 to FIG. 3, in the block S2, the laser etches the carbon nanotube array 10 to form one or more etching grooves 106 on the first surface 102. Laser beam scans on the first surface 102 and the scanned carbon nanotubes absorb the laser energy to increase the temperature thereof. The heated carbon nanotubes react with the oxygen gas in air and are burnt. Thus, the scanning of the laser beam removes some carbon nanotubes to forms the etching groove 106 on the first surface 102 of the carbon nanotube array 10. The scanning route of the laser beam can be controlled accurately by a computer, and a complicated and fine pattern of the etching grooves 106 can be formed on the first surface 102 of the carbon nanotube array 10. A power of the laser beam ranges from about 20 watts to about 50 watts and a moving speed of the laser beam ranges from about 0.1 millimeters per second (mm/s) to about 10000 mm/s. A width of the laser beam can be in a range from about 1 micron to about 400 microns.

The etching groove 106 can have a depth that is smaller than or equal to a height of the carbon nanotube array 10. In one embodiment, the depth of the etching groove 106 can be in a range from about 0.5 microns to about 10 microns. The etching groove 106 can have a width larger than or equal to 1 micron. The width and depth of the etching groove 106 is suitable for separating the carbon nanotubes in the preserving area 12 and the removing area 14. The carbon nanotubes are combined with each other by enough van der Waals attractive force to have the carbon nanotube structure 40 drawn therefrom. Thus, even the carbon nanotubes in the etching groove 106 are just shortened by the etching, the van der Waals attractive force can be decreased. Thus, during the drawing of the carbon nanotube structure 40 from the removing area 14, the carbon nanotubes in the preserving area 12 will not be drawn out with those in the removing area 14.

The etching groove 106 can have a line shape to divide the first surface 102 of the carbon nanotube array 10 into the preserving area 12 and the removing area 14. In one embodiment, the etching groove 106 forms two closed areas and the preserving area 12 and the removing area 14 are completely separated from each other by the etching groove 106.

In block S3, the carbon nanotube structure 40 is drawn from the removing area 14 to remove the carbon nanotubes in this area.

Block S3 can comprise:
  selecting a carbon nanotube segment having a predetermined width from removing area 14 by using a drawing tool; and
  drawing a plurality of carbon nanotube segments joined end to end by van der Waals attractive force by moving the drawing tool 50, thereby forming a continuous carbon nanotube structure 40.

The drawing tool can be adhesive tape, pliers, tweezers, or other tool allowing multiple carbon nanotubes to be gripped and pulled simultaneously.

The carbon nanotube segment comprises a single carbon nanotube or a plurality of carbon nanotubes substantially parallel to each other. The drawing tool such as adhesive tape can be used for selecting and drawing the carbon nanotube segment. The adhesive tape may contact with the carbon nanotubes in the carbon nanotube array to select the carbon nanotube segment. The drawing tool can select a large width of carbon nanotube segments to form the carbon nanotube film, or a small width of the carbon nanotube segments to form the carbon nanotube wire.

An angle between a drawing direction of the carbon nanotube segments and the growing direction of the carbon nanotubes in the carbon nanotube array 10 can be larger than 0 degrees (e.g., 30° to 90°).

In the block S3, when drawing to the edge of the removing area 14, due to the etching groove 106, the carbon nanotube structure 40 will naturally separate from the carbon nanotube array 10. The carbon nanotubes in the preserving area 12 are thus left on the substitute substrate 30.

In block S3, the carbon nanotube structure 40 is drawn from the carbon nanotube array 10 that was transferred to the substitute substrate 30, not from the carbon nanotube array 10 located on the growing substrate 20. The carbon nanotube structure 40 can be drawn from the carbon nanotube array 10 upside down on the surface 302 of the substitute substrate 30 (i.e., drawn from the first surface 102 of the carbon nanotube array 10).

Block S3 is different from the separating of the carbon nanotube array 10 as a whole from the growing substrate 20. The carbon nanotube array 10 separated from the growing substrate 20 still in the array shape. The purpose of block S3 is to draw out carbon nanotubes one by one or segment by segment to form a carbon nanotube film or wire from the carbon nanotube array 10 on the substitute substrate 30.

Figure 11:
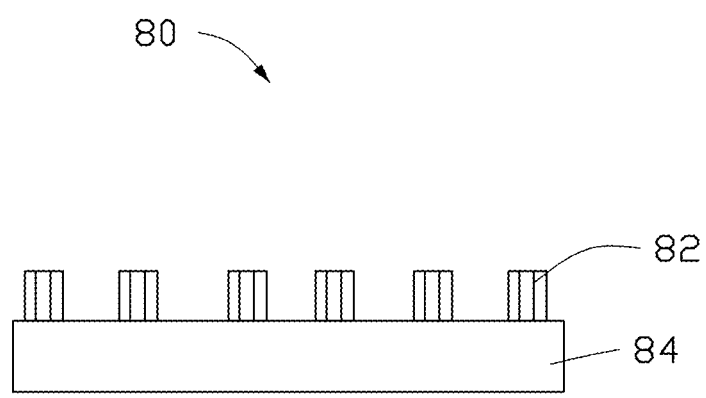
FIG. 11 is a schematic side view of an embodiment of a carbon nanotube device.

Referring to FIG. 11, an embodiment of a carbon nanotube device 80 is further provided. The carbon nanotube device 80 comprises a main body 84 and a patterned carbon nanotube array 82 located on a surface of the main body 84. The patterned carbon nanotube array 82 is capable of having the carbon nanotube structure 40 drawn therefrom. The carbon nanotube device 80 can be formed by using the above described method. The main body 84 can be used as the substitute substrate 30. The carbon nanotube array 10 is first transferred to the main body 84 and then patterned by using the blocks S2 and S3. The main body 84 can be made of an insulating material or a conducting material. In some embodiments, the main body 84 can be a print circuit board (PCB), central processor unit (CPU), heat sink, or other devices that having the needs for the electrical conducting, thermal conducting, and/or mechanical properties of the carbon nanotube array.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for patterning a carbon nanotube array, the method comprising:
   providing a carbon nanotube array transferred onto a surface of a substitute substrate, the carbon nanotube array having a second surface adjacent to the substitute substrate and a first surface away from the substitute substrate, the carbon nanotube array having an ability to have a carbon nanotube structure drawn therefrom, and the carbon nanotube structure comprising a plurality of carbon nanotubes joined end to end;
   laser etching the first surface of the carbon nanotube array to divide the carbon nanotube array into a preserving area and a removing area; and
   drawing the carbon nanotube structure from the removing area and leaving carbon nanotubes in the preserving area.

2. The method of claim 1, wherein the providing the carbon nanotube array comprising:
   providing a growing substrate having the carbon nanotube array grown thereon, the carbon nanotube array having the first surface adjacent to the growing substrate and the second surface away from the growing substrate, and the carbon nanotube array having the ability to have a carbon nanotube structure drawn therefrom;
   contacting the surface of the substitute substrate to the second surface of the carbon nanotube array; and
   separating the substitute substrate from the growing substrate, thereby separating the first surface of the carbon nanotube array from the growing substrate to transfer the carbon nanotube array from the growing substrate to the substitute substrate, and the carbon nanotube array still having the ability to have a carbon nanotube structure drawn therefrom.

3. The method of claim 2, wherein the surface of the substitute substrate and the second surface of the carbon nanotube array are combined only by van der Waals attractive forces.

4. The method of claim 2, wherein the surface of the substitute substrate has a plurality of microstructures located thereon.

5. The method of claim 2, wherein the substitute substrate is spaced from the growing substrate by a spacing element, and the spacing element has at least a portion located between the substitute substrate and the growing substrate, and the portion of the spacing element has a height less than or equal to the height of the carbon nanotube array.

6. The method of claim 1, wherein the carbon nanotube array is transferred to the substitute substrate by:
   providing a growing substrate having the carbon nanotube array grown thereon, the carbon nanotube array having the first surface adjacent to the growing substrate and the second surface away from the growing substrate, the carbon nanotube array having the ability to have a carbon nanotube structure drawn therefrom;
   placing the substitute substrate on the second surface of the carbon nanotube array and sandwiching liquid medium between the substitute substrate and the carbon nanotube array;
   solidifying the liquid medium between the substitute substrate and the carbon nanotube array into solid medium;
   separating the substitute substrate from the growing substrate, thereby separating the first surface of the carbon nanotube array from the growing substrate; and
   removing the solid medium between the substitute substrate and the carbon nanotube array, wherein the carbon nanotube array still having the ability to have a carbon nanotube structure drawn therefrom.

7. The method of claim 6, wherein the sandwiching the liquid medium between the substitute substrate and the carbon nanotube array comprises:
   forming the liquid medium on the second surface of the carbon nanotube array; and
   contacting the surface of the substitute substrate and the liquid medium on the second surface with each other.

8. The method of claim 7, wherein the solidifying the liquid medium between the substitute substrate and the carbon nanotube array comprises contacting the substitute substrate having a temperature below a freezing point with the liquid medium on the second surface of the carbon nanotube array.

9. The method of claim 6, wherein the sandwiching the liquid medium between the substitute substrate and the carbon nanotube array comprises:
   forming the liquid medium on the surface of the substitute substrate; and
   contacting the second surface of the carbon nanotube array and the liquid medium on the surface of the substitute substrate with each other.

10. The method of claim 6, wherein the solidifying the liquid medium between the substitute substrate and the carbon nanotube array comprises placing a lamination of the growing substrate, the carbon nanotube array, the liquid medium, and the substitute substrate into a freezer, the freezer having an internal temperature below a freezing point of the liquid medium.

11. The method of claim 6, wherein the liquid medium is water, the solid medium is ice.

12. The method of claim 1, wherein the laser etching the carbon nanotube array forms an etching groove on the first surface.

13. The method of claim 12, wherein a depth of the etching groove is smaller than or equal to a height of the carbon nanotube array.

14. A carbon nanotube device comprising a device body and a patterned carbon nanotube array located on the device body, the patterned carbon nanotube array having an ability to have a carbon nanotube structure drawn therefrom, the carbon nanotube structure comprising a plurality of carbon nanotubes joined end to end, the patterned carbon nanotube array is patterned from an original carbon nanotube array grown on a growing substrate, and the device body is not the growing substrate.

15. A method for patterning a carbon nanotube array, the method comprising:
providing a carbon nanotube array transferred onto a second substrate from a first substrate, the carbon nanotube array having a second surface adjacent to the second substrate and a first surface away from the substitute substrate, the carbon nanotube array having an ability to have a carbon nanotube structure drawn therefrom, and the carbon nanotube structure comprising a plurality of carbon nanotubes joined end to end;
laser etching the first surface of the carbon nanotube array to divide the carbon nanotube array into a preserving area and a removing area; and
drawing the carbon nanotube structure from the removing area and leaving carbon nanotubes in the preserving area.

* * * * *